US005233341A

United States Patent [19]

Duthoit et al.

[11] Patent Number: 5,233,341

[45] Date of Patent: Aug. 3, 1993

[54] INSTALLATION FOR THE REMOTE MONITORING AND CONTROL OF THE OPEN AND CLOSED STATE OF ONE AMONG A PLURALITY OF CONTACTS

[75] Inventors: Jean-Pierre Duthoit, Fourqueux; Patrice H. Bernard, Paris, both of France

[73] Assignee: Societe Nationale des Chemins de fer Francais, Paris, France

[21] Appl. No.: 613,640

[22] PCT Filed: Apr. 6, 1990

[86] PCT No.: PCT/FR90/00245

§ 371 Date: Nov. 30, 1990

§ 102(e) Date: Nov. 30, 1990

[87] PCT Pub. No.: WO90/12411

PCT Pub. Date: Oct. 18, 1990

[30] Foreign Application Priority Data

Apr. 7, 1989 [FR] France ............................... 89 04587

[51] Int. Cl.[5] ............................................ H04Q 9/00

[52] U.S. Cl. ......................... 340/825.06; 340/825.07; 340/825.16

[58] Field of Search ...................... 340/825.06, 825.07, 340/825.15, 825.16, 825.17, 825.54, 825.08; 361/23, 99, 167, 172, 182, 183; 246/15, 16, 187 A, 187 B

[56] References Cited

U.S. PATENT DOCUMENTS

| | | | |
|---|---|---|---|
| 3,553,449 | 1/1971 | Hathaway | 340/825.17 |
| 4,532,509 | 7/1985 | Pulverenti et al. | 340/825.15 |
| 4,831,558 | 5/1989 | Shoup et al. | 340/825.06 |

FOREIGN PATENT DOCUMENTS

| | | |
|---|---|---|
| 2538152 | 3/1977 | European Pat. Off. . |
| 197835 | 10/1986 | European Pat. Off. . |
| 2375674 | 7/1978 | France . |
| 2418562 | 6/1979 | France . |

*Primary Examiner*—Donald J. Yusko
*Assistant Examiner*—Edwin C. Holloway, III
*Attorney, Agent, or Firm*—Sughrue, Mion, Zinn, Macpeak & Seas

[57] ABSTRACT

An apparatus for monitoring at a distance the open or closed state of at least one contact. The installation consists of a non-security control circuit made up of coder couples (such as $CM_1$, $CV_1$ $CM_2$, $CV_2$ and $CM_3$ $CV_3$) and a microcontroller (1), connected by a modem (2) and a data transmission link (3) to a central security control (LST). This installation is useful in the railway domain, to remotely monitor contacts.

21 Claims, 3 Drawing Sheets

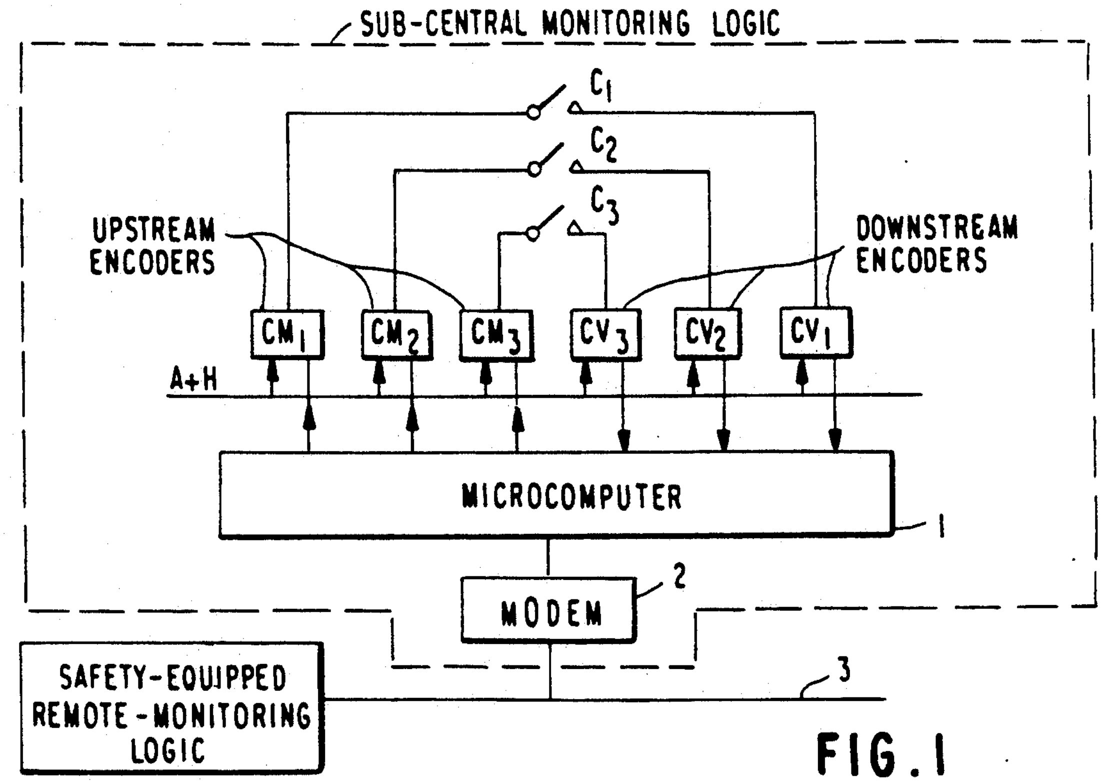
FIG. 1
FIG. 2
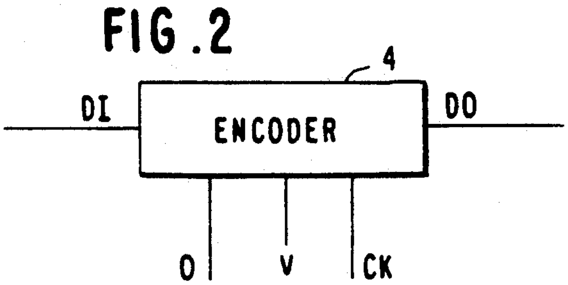
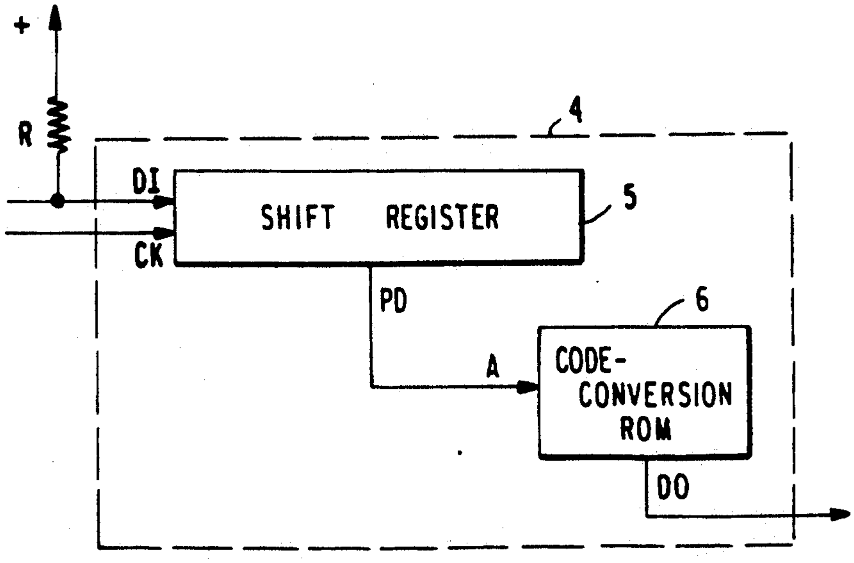
FIG. 3

INSTALLATION FOR THE REMOTE MONITORING AND CONTROL OF THE OPEN AND CLOSED STATE OF ONE AMONG A PLURALITY OF CONTACTS

BACKGROUND OF THE INVENTION

The present invention concerns an installation for the remote monitoring and control of a plurality of devices by means of contacts whose opened or closed position is monitored and controlled.

The invention may be applied, in particular but not restrictively, to railroad equipment such as switches at a switching station, axle counters, level crossings, or any other devices that must be monitored and/or controlled.

As regards the control of railroad switches, for example, conventional use is made of a number of techniques, of which the oldest, which is still implemented today, is on-site lever-activated control, involving the visual monitoring of the closing of the switches.

Use is also made of another type of mechanical control system, which involves controlling said switches from a switching station by means of cables or rods. Using this principle, position control is no longer effected by direct inspection of the closing of the switches, as in the preceding method, but rather from the switching station where the control position is visually ascertained. Since this position is, again, mechanical, it represents, in the safety mode, the position of the switches.

Next, passing from mechanical to the electric systems, there is another family of installations in which the position of the switches is monitored electrically from a station generally linked to a remote-control system, when the switches to be maneuvered are controlled by motors.

This monitoring system unites data acquisition and transmission. Acquisition generally occurs by closing electrical contacts by means of switches which are connected mechanically by means of a repeating system or after rotational conversion, to the blades of the switches. Transmission is normally occurs by using these electrical contacts to set up or break the flow of current in as many distinct loops as there are contacts to be monitored. The current source is generally placed in the switching station, as is the means for ascertaining the opened or closed state of the loops. For reasons of simplicity, transmission is not multiplexed, so that a minimum of four contacts and five wires are needed if one wishes to have loops capable of detecting individually the closing or unclosing of each of the blades composing the switch. Similarly, the lack of multiplexing prohibits the sharing of the transmission means, which would allow the remote monitoring of several switches.

In practice, the methods listed above entail many problems.

In particular, as regards the mechanical methods, on-site manipulation and control require the presence of a human agent, and thus his movement toward each of the switches, thereby entailing a lack of flexibility and substantial expense. Similarly, as regards the mechanical remote monitoring of the switches, one immediately apparent constraint results from the necessarily limited distance from the switching station to the various switches being monitored. Despite increased flexibility and economy as compared with the preceding system, this system is poorly suited to the merging of several small stations into one larger station.

As for the electric installations, remote-monitoring by means of current loops is very reliable, but transmission is costly and certain acquisition techniques are not feasible. Thus, the cost of transmission results from the fact that a minimum of five wires are required to operate four contacts linked to the blades of a single switch, and that it is not possible to share the use of these wires to operate several adjoining switches or those positioned along the same track. In practice, this individual wire requirement also prohibits the use of a radio link between the switch and either the switching station or, in some cases, a train approaching this station. Transmission by means of current loops prohibits the use of acquisition techniques which utilize current or voltage levels or, yet again, signalling frequencies which require, in practice, local signal shaping.

OBJECT OF THE PRESENT INVENTION

Therefore, the purpose of the present invention is the creation of the system for the remote monitoring and control of switches which, in return for the low cost of equipment linked to one switch, allows the multiplexing of the transmission of various data pertaining to a switching installation and, if desired, to several switching installations, under conditions which ensure rail-system safety.

The purpose of the present invention is an all-inclusive system for the remote-monitoring and/or remote-control of contacts which activate a multiplexed link between a safety-equipped monitoring and/or control center and one or several sub-central logics, each of which makes possible the control of one or several contacts located at a short distance from said logics.

Multiplexing here designates any technique making possible the sharing of a transmission medium among several data flows. The nature of the multiplexing may be frequency, temporal, or logical. The connection may be point-to-point, multipoint (or by means of a bus), or in a loop.

This system is characterized by the fact that overall safety is ensured through the use of a safety data-processing system in a monitoring center; that the transmission between the central safety monitoring system and the individual monitoring means (or sub-central logics) can activate a procedure allowing the detection of transmission errors; and that the individual monitoring means must not necessarily be inherently safe, but that, in response to a monitoring signal transmitted by the central monitoring signal, they work, through a local coded signal (which may be added to a coding emanating from the central safety-equipped monitoring system), in conjunction in the transmission of data having a redundancy such that, when they are received, the central monitoring system can ascertain, with the desired degree of reliability, the identity of the contact monitored and its status, and can possibly date the data supplied pertaining to this identity and status.

In the system according to the present invention, transmission must certainly the matched with the transmission of a redundant datum which would allow the appropriate procedure to verify whether an error has not been introduced; however, it may be assumed that a procedure of this kind does not necessarily have to be implemented, since, in fact, this verification will be carried out when the datum, suitably modified, is fed back to the safety-equipped monitoring system.

BRIEF DESCRIPTION OF THE DRAWINGS

The above-mentioned features and others, as well as secondary characteristics will emerge in a more detailed fashion in the following description of an embodiment described with reference to the attached drawings, in which:

FIG. 1 represents the control of three contacts by means of a non-safety-equipped monitoring logic;

FIG. 2 shows the simplified diagram of one of the encoders in FIG. 1;

FIG. 3 represents an embodiment of one of the above-mentioned encoders;

DETAILED DESCRIPTION OF THE PREFERRED EMBODIMENT

Figure 4:
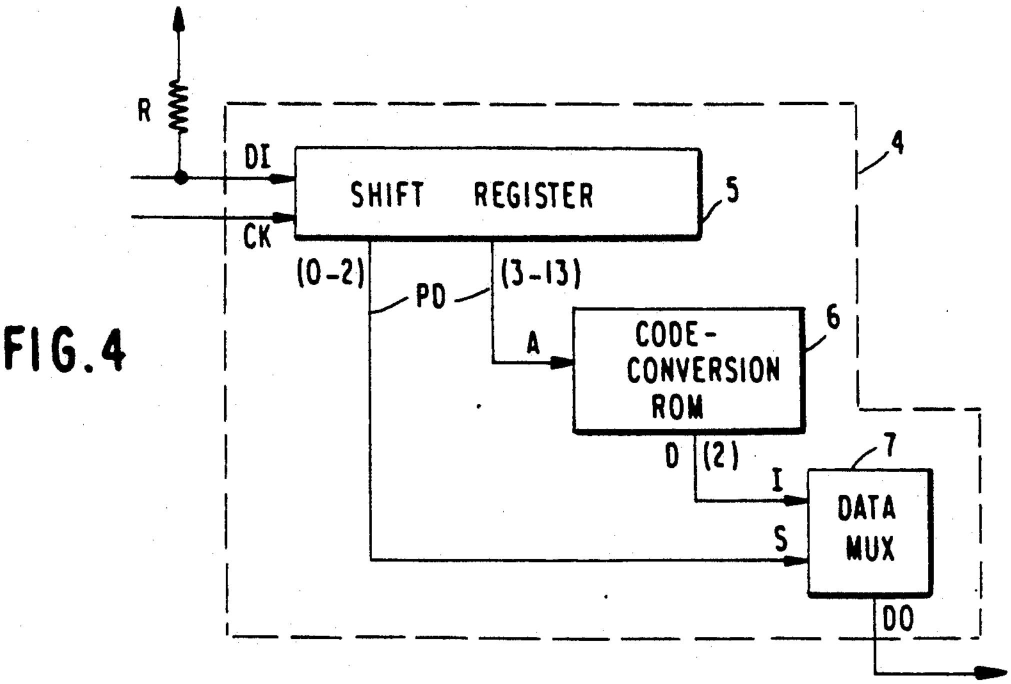
FIG. 4 represents a variant of the encoder in FIG. 3.

The invention will be better understood from a reading of the description of a preferred embodiment of a contact controller.

FIG. 1 illustrates the monitoring installation according to the present invention, as applied to the monitoring of three contacts $C_1$, $C_2$, and $C_3$ using a single non-safety-equipped monitoring logic or sub-central logic (LSC), whose production does not utilize an inherent-safety technology.

This non-safety-equipped monitoring logic comprises three pairs of encoders $CM_1$, $CV_1$, $CM_2$, $CV_2$, and $CM_3$ and $CV_3$ and a microcontroller 1, connected by a modem 2 and a data-transmission link 3 to a central safety-equipped remote-monitoring logic LST.

Each of the pairs of encoders $CM_i$, $CV_i$ comprises two identical encoders 4, $CM_i$ being the "upstream" encoder and $CV_i$, the "downstream" encoder, whose simplified diagram appears in FIG. 2, which shows the encoder 4 which, at its series input DI, receives the data to be encoded, and which, at its series output DO, supplies the coded data. Furthermore, it receives power (represented by inputs 0 and V), and a clock at its input CK. All of the encoders share the same power supply and receive their clock from a common source, the power-clock combination being represented by A+H in FIG. 1.

A pair of encoders $CM_i$, $CV_i$, functions in the following way: The "upstream" encoder, such as $CM_1$, receives the data requiring encoding from the microcontroller 1, subjects these data to a first encoding, and sends the coded data to the contact to be monitored, such as $C_1$. If contact is established, these data reach the input of the "downstream" encoder, such as $CV_1$, which subjects them to a second encoding and transmits the data thus doubly converted to the microcontroller 1.

The encoders $CM_i$, $CV_i$ do not share any component, thus avoiding common-mode defects. To the fullest possible extent, the wiring connecting one contact to its "upstream" and "downstream" encoders is installed so as to remove any possibility of a short-circuit, which would allow the data encoded by the "upstream" encoder to enter the "downstream" encoder without travelling through the contact to be monitored. For this purpose, one precaution may consist in moving the "upstream" and "downstream" as close as possible to the contact to be monitored.

The encoding laws of the different pairs $CM_i$, $CV_i$ must differ from one pair to another (since these laws make it possible to identify the contact $C_i$). On the other hand, it makes no difference whether the encoding laws of $CM_i$ and $CV_i$ are identical; besides, $CM_i$ or $CV_i$ could be absent.

FIG. 3 illustrates in more detail the structure of an encoder 4, which comprises a shift register 5 having a series input and a parallel output and a read-only code-conversion memory 6.

The series-parallel register 5 causes the data fed into its input DI to be entered according to the timing of a clock fed into its input CK. A pull-up resistor R, installed "upstream" from DI, ensures that the data presented have a constant logical value when the input DI is "disconnected". This disconnected situation corresponds to the case of a "downstream" encoder whose contact to be monitored is open.

The parallel output PD of the shift register 5, or at least certain wires belonging to this output, is connected to the addressing input A of the read-only code-conversion memory 6. It will be supposed that this code-conversion memory is structured according to $m \times 1$, i.e., that it has only a single data-output DO. If it is supposed that the n last bits entered in the series-parallel register 5 are used to address the code-conversion memory 6, it is seen that each bit transmitted to the output DO results from the code conversion, effected by the content of the read-only code-conversion memory 6, of the n last bits received by the series-parallel register 5.

FIG. 4 illustrates a variant of the encoder 4 in FIG. 3, characterized by the fact that the read-only code-conversion memory 6 is structured in octets. The eight data-outputs D of the read-only code-conversion memory 6 are connected to the data-output I of a data-multiplexer 7, whose three selection inputs S are connected to three outputs $PD_{o\text{-}2}$ of the shift register 5, e.g., those which correspond to the three last bits fed to the input DI of the register 5.

The addressing input A of the read-only code-conversion memory 6 is connected to outputs in the shift register 5, which correspond to older bits, e.g. $PD_{3\text{-}13}$ in the case in which the read-only code-conversion memory 6 is composed of an 8-Koctet EPROM.

The read-only code-conversion memory may have any content whatever, but it differs between the code-conversion memory $MT_i$ and the code-conversion memory $MT_j$, which are linked, respectively, to contacts $C_i$ and $C_j$, if the two contacts i and j are connected to the same non-safety-equipped monitoring logic (or sub-central logic), or to non-safety-equipped monitoring logics which are separate but connected by a single data-link 2 to a single safety-equipped remote-monitoring logic (or central logic).

The number of bits transmitted by the microcontroller 1 in FIG. 1 to an "upstream" encoder such as CM1 may be any number whatever and is, in particular, less than the capacity of the read-only code-conversion memory MT. For example, the capacity of this memory may be 64 Kbits, while the message to be encoded may have a length of 256 bits.

It might prove interesting to begin the message to be encoded with (or to have it preceded by) a stable sequence, for example n zeros followed by a 1. In the case of a 64 Kbits memory 6, the first 16 code-converted bits are unpredictable, but the following $(n-16)$ are identical to the first bit of the memory, and the $(n+1)$th bit will be identical to the content of the second bit of the memory. This would make it possible, if necessary, to recognize the beginning of the code-converted message and to make it act, in a way, as a synchronization sequence. If the first two bits of the memory are 0 and 1, respectively, the sequence emanating from the code-conversion memory 6 of the "upstream" encoder can be used to play the same role with respect to the "downstream" encoder.

The case may be considered in which the remainder of bits sent by the microcontroller 1 comprises, after this synchronization sequence, another sequence which, being always the same, therefore always supplies the same response after undergoing successive code conversions effected by the linked upstream and downstream encoders $CM_i$ and $CV_i$. This response will thus constitute, as it were, the "signature" or "imprint" of the contact $C_i$, if it is closed.

If the remainder of the sequence sent after the synchronization sequence is random, the response after code conversion will constitute another signature, but it will be encoded, so to speak, and not clear. The advantage of incorporating a portion of the interrogation sequence which changes each time lies in the ability to "date" the contact response. Attempts will thus be made to guard against the risk that the status thus monitored will be accurate, will correspond to the desired equipment, but will nevertheless be obsolete. This risk is real in equipment incorporating a memory which can transmit an obsolete, instead of a fresh, response.

To guard against this possibility, the series of bits transmitted can be explicitly dated, i.e., a time or order number can be incorporated into it.

A date can also be implicitly incorporated, by introducing a pseudo-random sequence, thereby making any series of bits different from the preceding one. It becomes easy to determine whether the series of bits being considered is the most recent or not, which is all that is normally demanded.

The data sent by the microcontroller 1 (FIG. 1) to the upstream encoders $CM_1$, $CM_2$, and $CM_3$ may completely different, but they may also be identical, the transmission occurring in parallel. In fact, one may contemplate the case in which the safety-equipped remote-monitoring logic (main logic) is connected to various non-safety-equipped monitoring logics (LSC—sub-central logics) by a data-link 3 whose output rate is relatively fast, and in which the central logic asks a non-safety-equipped monitoring logic LSC (sub-central logic) to send the same interrogation sequence to all of the upstream encoders and to send back to it all of the responses not composed of identical bits, which is the case of the response corresponding to an open contact.

It will be noted that the microcontroller can distribute to the various encoders a clock whose timing is relatively slow, so as to make it possible to monitor relatively distant contacts without requiring excessively special wiring installations.

The application of the present invention to the monitoring and control of a number of sub-central rail devices from a central station will now be described.

The central station is equipped with a safety-equipped remote-monitoring logic combining inherent-safety electronics and safety relay-based interfaces. Each device is associated with a sub-central monitoring logic, whose distinctive feature is that it is made from externally purchased non-safety-equipped components.

The devices under consideration may be, in particular, a switch, an axle counter, or a level passage, without being limited to these latter. The central station may be served by an agent or connected by wire or radio link to a monitoring center or a motorized machine, e.g., a locomotive.

Figure 5:
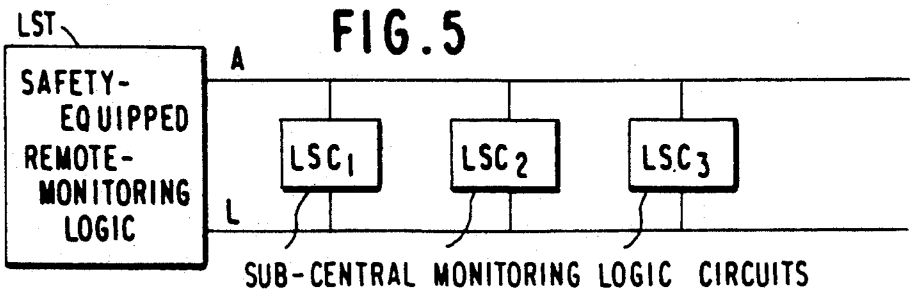
FIG. 5 an overall diagram of a safety-equipped remote-monitoring logic linked to a plurality of sub-central remote-monitoring logics.

In FIG. 5, the sub-central monitoring logics $LSC_1$, $LSC_2$, $LSC_3$ of the various devices controlled by the central station LST are connected to the central safety-equipped monitoring logic by a multipoint link comprising a power line A and a data-link L. The power line A is divided into a three-phase power supply intended for the manipulation of each device and an auxiliary power supply intended for the feed of the sub-central monitoring logic.

The sub-central monitoring logics $LSC_i$ and the link LST - $LSC_i$ are not inherent-safety devices; however, the safety of the entire unit is provided solely by the central logic LST known to be of the safety type.

Each sub-central monitoring logic $LSC_i$ comprises two microcontrollers corresponding to two different addresses on the multipoint line, controlled by the central safety-equipped remote-monitoring logic LST.

The principle of remote-monitoring will be described with reference to FIG. 6. To monitor the position of a device, the safety-equipped remote-monitoring logic LST sends to the sub-central monitoring logic LSC linked to the device to be controlled a pseudo-random series of n bits. This series is thus dated, since it is different from the one sent during the preceding monitoring operation.

The safety-equipped remote-monitoring logic LST receives, sent back from the sub-central monitoring logic LSC addressed, another series of n bits based on which the LST can verify unambiguously the correlation with the transmitted series of bits, the number of the sub-central logic addressed, and the position of the monitored device.

Monitoring reliability thus depends on the safety comparison made by the safety-equipped remote-monitoring logic LST between the series of bits transmitted and the series of bits received. The required reliability level is obtained by manipulating the length n of the series of bits and the complexity of the encoding function. More specifically, an attempt is made to verify the similarity, or the quasi-similarity, between the series of bits received and a certain local transform of the series of bits transmitted.

More precisely, the safety-equipped remote-monitoring logic LST sends a double series of bits $E_1+E_2$. The series of bits $E_1$ is received by the microcontroller $MC_1$ and the series of bits $E_2$ is received by the microcontroller $MC_2$.

Each microcontroller sends back its series of bits, $E_1$ or $E_2$ respectively, to the other microcontroller of the same sub-central remote-monitoring logic, this transmission passing through the contacts $\Gamma_1$ or $\Gamma_2$ of the device controller.

Since the device control unit can be in only one of two possible stable positions, a single microcontroller can transmit its series of bits. During the time normally corresponding to the half-opening of the switch, neither of the two microcontrollers can succeed in transmitting its series of bits.

In the event that the two series of bits should be transmitted simultaneously, an extraordinary, abnormal situation would be created corresponding, for example, to the state in which the two blades of the switch would be closed together, thus revealing a mechanical break.

In the normal, most widely-occurring situation, that one of the two microcontrollers $MC_1$ or $MC_2$ of the sub-central logic LSCX which has received the series of bits emanating from the other transmits back to the safety-equipped remote-monitoring logic LST a series of bits $S_1$ or $S_2$, which is a function of the series of bits received from the other microcontroller $S_1=f_1(E_2)$ or $S_2=f_2(E_1)$. Each of the functions $f_1$ and $f_2$ is characteristic of the microcontroller through which the transmission passes.

The safety-equipped remote-monitoring logic LST thus receives back, as a result of the double series of bits $E_1$ and $E_2$, a series of bits $S_1$ and/or $S_2$, this series being characteristic both of the series of bits emitted and of the path travelled between the two microcontrollers of this sub-central monitoring logic LSC through the contacts to be monitored.

Figure 6:
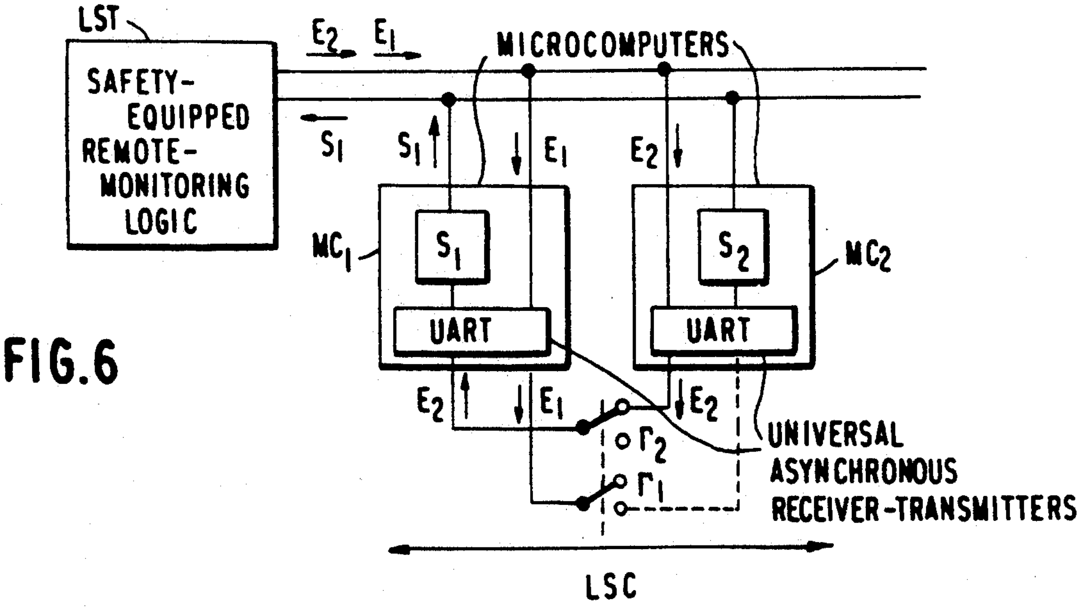
FIG. 6 is a simplified diagram of the position-monitoring circuit.

If reference is made to the example in FIG. 6, it is seen that, as a result of the position of contacts $\Gamma_1$ and $\Gamma_2''$ the series $E_1$ cannot be transmitted from microcontroller $MC_1$ to $MC_2$.

The functions $f_1$ and $f_2$ are mathematically determined according to the error rate judged to be acceptable. As an example, the function can be an exclusive OR effected bit by bit (or octet by octet) between the series of n bits $E_1$ or $E_2$ and a reference series of n bits $R_1$ or $R_2$, having the form $S_1=\Sigma\ (E_2(i)+R_2(i))$ and $S_2=\Sigma\ (E_1(i)+R_2(i))$.

The "distance" between two series of n bits is generally defined as the number of bits of the same position which are different in the two messages.

The series of bits are chosen so that the "distance" between them is as great as possible. Each reference series of bits will thus be typical of the microcontroller where the function f is performed. It is stored in the programmable read-only memory (PROM) of the card.

The LST knows the code-conversion law linked to the contact it wishes to monitor. Since it knows the content of the series of pseudo-random bits it has emitted, it knows exactly what series of bits its should receive.

If it compares this series received to the expected series, it can determine the distance between them.

In the absence of any error, this distance should be null.

Reliability will be maximal when only contacts for which the distance measured is zero are considered to be closed.

However, if the series of bits is long and if the number of different contacts to be monitored across the same data-link is not excessively large, the degree of reliability is still great if a distance less than a particular level, which is not zero, is accepted.

After zero reset, each microcontroller initializes its buffer storage registers so as to send back to the safety-equipped remote-monitoring logic a series of bits indicating proper reinitialization and its identity. This may be the same series of bits R.

Figure 7:
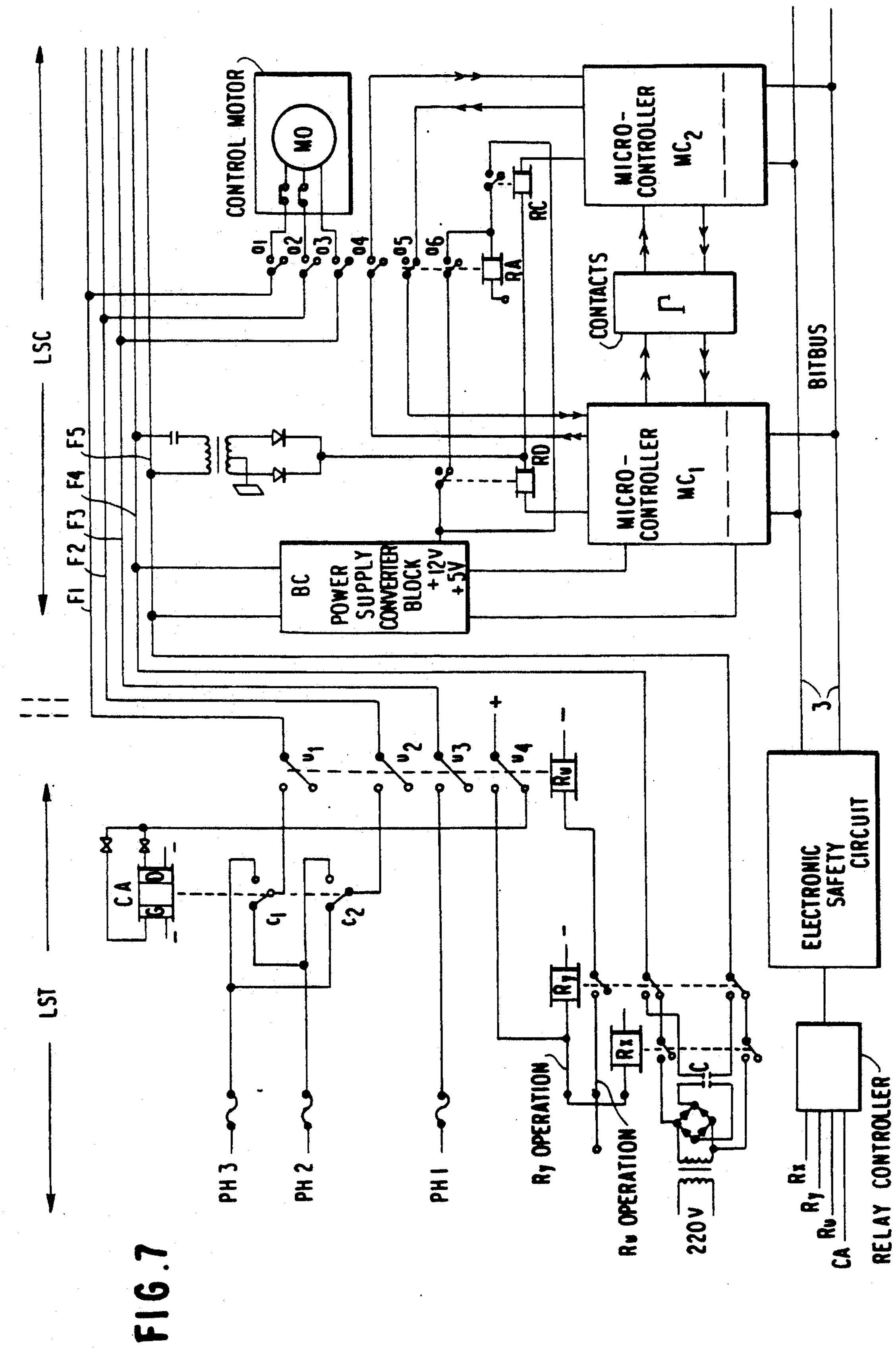
FIG. 7 is a diagram of a sub-central monitoring logic and its interface with the safety-equipped remote-monitoring logic.

The principle underlying remote control will be described with reference to FIG. 7. The control motor Mo for the device is remote-fed from the safety-equipped remote-control logic LST by means of the three-phased power supply described below.

The power line comprises a cable incorporating five conductors ($F_1$ to $F_5$) which combine two distinct power supplies: first, a three-phased power supply for devices using wires $F_1$ to $F_3$ (whose section is determined by the consumption of a single device at one time), and second, an auxiliary power supply using wires $F_4$ and $F_5$ for the remote feed of the sub-central monitoring logics LSC and the lock-in of the switch relays RA.

Under the control of the safety-equipped software in the central remote-monitoring logic LST, this auxiliary power supply can adopt three different states, depending on the statuses of the relays Rx and Ry: direct, if relay Ry is operational; alternating, if Ry is at rest and Rx is operational; and zero if Rx and Ry are at rest.

The electronics of the sub-central monitoring logics may be fed by both direct and alternating currents, by using a power-supply converter block having "direct sector breakdown" BC. Its inertia is sufficient to cover the alternating-direct switching times (and vice-versa) at the safety-equipped remote-monitoring logic LST.

The device relays RA, which are prepositioned in the sub-central monitoring logics in the first stage of equipment control, as has been described above, are controlled by a bonding relay RC and by an unbonding relay RD, which are operated solely by an alternating feed.

The momentary absence of any power over wires $F_4$ and $F_5$ of the auxiliary power supply entails the drop of the relays RA and causes a zero reset of all of the microcontrollers of the sub-central monitoring logics LSC.

The solution calling for the separation of the data-link and the power line was chosen for various reasons, but mainly the freedom of the technological evolution of data transmission (fiber optics, etc.) and the safety of the maintenance teams, which are thus not obliged to work in the presence of dangerous voltage.

A remote-control procedure for a single motor $M_o$ involves three stages:

1) the prepositioning of the device relay RA in question, which entails the successive implementation of the following operations:

Authorization is given to close the relays RA of all of the sub-central monitoring logics LSC connected to the multipoint line by means of the auxiliary alternating power supply;

The order to close is given over the data-link 3 only to the relay RA of the device in question, which is self-maintaining;

The power line is used to prohibit any new modification of the status of the relays RA (by means of auxiliary direct current).

Verification is made that only the relay RA is closed, by using the principle of the remote-monitoring operations previously described.

2) once the relays RA have been positioned and locked in by means of the auxiliary direct-current power supply, the command is carried out by sending over the power line the three-phased power feed (by $F_1$, $F_2$, and $F_3$) intended to effect the movement of the device. The direction of this movement is obtained by reversing the two phases at the safety-equipped remote-monitoring logic LST, which is the only one operating on the basis of inherent safety. Manipulation of the device is similar to a "lost command." Consequently, the device must be protected by end-of-travel contacts or a device possessing enhanced friction. However, if the end of travel is correctly detected by switch monitoring, the lost command may be prematurely cut off by the software in the safety-equipped remote-monitoring logic LST.

3) The return to resting status of the relays RA is effected using the same succession of operations as that performed during prepositioning, and the unbonding of the relays RA is ordered while the auxiliary power supply feeds alternating current.

The relay RA of the device is mounted in a self-bonding arrangement. Its bonding is ensured by a bonding relay RC controlled by the microcontroller $MC_2$ of the sub-central monitoring logic LSC, while its unbonding is effected by an unbonding relay RD controlled by the microcontroller $MC_1$.

The two relays RC and RD are fed from the auxiliary power supply delivered by $F_4$ and $F_5$, by means of a transformer TR, which constitutes an inherent safety device for the transmission of alternating power. Even in the event of a malfunction of the microcontrollers of the sub-central monitoring logic LSC, the bonding and unbonding relays can be activated only while alternating current is supplied from the auxiliary power supply.

Thus, inherent safety provides the certitude that a relay RA cannot close while the auxiliary power supply feeds direct current, a condition imposed by the safety-equipped remote-monitoring logic LST before delivering three-phase power to the only relay RA which will have closed during the authorized prepositioning phase.

To prevent a failure of one sub-central monitoring logic LSC, whose microcontroller $MC_2$ would assume continuous control of the bonding relay RC, from jamming the other sub-central monitoring logics on the multipoint line, RC control is made to work by pulses, by means of a capacitance circuit, which does not have to be a safety circuit.

No other precaution need be taken with respect to the control of relays RC and RD.

In fact, the bonding relay RC can be activated only when the auxiliary power supply feeds alternating current and, what is the most important factor as regards the relay RA of the device, it is not its non-safety control, but its safety position monitoring executed prior to the feed of the three-phase power supply. The safety of the command rests, in a way, on the safety of the monitoring of the pre-command.

The solution described above for the sub-central monitoring logic applied to a switch has a substantial economic advantage because of the wiring used. Indeed, use is made of a single power line incorporating five conductors and of one data-link, both multipoint, between the station housing the safety-equipped remote-monitoring logic and the switches. On the other hand, in the embodiments now used, the point-to-point link between the station and each switch comprises at least four conductors having a large section (a circuit termed "four-wire").

Since only one device is controlled at one time, power consumption over the power line is very low in comparison with conventional stations, for which no logic device prohibits the simultaneous operation of several switches. The solution proposed in the invention derives its benefit from a continuous tracking of the traffic, thus avoiding accumulation points in the operation of the switches, whose average use rate over a long period of time is, in fact, nearly zero.

Another financial advantage results from the very low cost of the sub-central monitoring logics produced from externally-purchased microcontrollers. Only the central remote-monitoring logic is made as a safety logic, and its interface with the power line by means of safety relays is extremely simplified.

The data-link and the sub-central monitoring logic will be described in succession with reference to FIG. 7.

The data-link 3 chosen is a double twisted, metal-clad pair used, according to the INTEL BITBUS protocol, in the differential mode (RS485), whose principal features of the option selected are as follows:

transmission rate:62.5 kbit/s maximum length of a segment between repeaters:1,200 m maximum number of node points per segment:28 maximum number of repeaters crossed:10 total maximum number of node points:250, a number corresponding to a theoretical maximum of 125 switches, since the two microcontrollers of a single sub-central monitoring logic each constitute a node point according to BITBUS addressing.

Two constraints influence the maximum practical number of node points which may be connected to the BITBUS:

1) The power consumption of the node points on the auxiliary power line, especially of direct current, which is its most frequent state (the residual ripple factor of the auxiliary direct-current power supply must in no case allow a backfeed of the relays RC across the transformers).

2) The response time, which is, in practice, limited to 5 or 6 switch commands per minute, only one switch being able to be controlled at one time.

A single safety-equipped remote-monitoring logic LST can run several BITBUS's, the apparatuses being spread out so as always to have a minimum number of "routes" available, even in the event of a failure of a BITBUS.

Standard galvanic isolation repeaters are available as BITBUS accessories. They require a dual 12 V direct-current power supply in both directions; this feed may be supplied locally from the power furnished from the sub-central monitoring logic LSC, or by transmission over the BITBUS cable of an additional 12 V remote power feed, an BITBUS standard option.

The sub-central switch-monitoring logic LSC comprises two microcontrollers $MC_1$ and $MC_2$ produced from trade DATEM DCB 220 cards.

The BITBUS cards use the INTEL 8044 microcontroller, an 8052 to which an HDLC (High Level Data Link Control)-series, high-speed (up to 2.4 Mbit/s) is added. Each micro-controller is connected to the BITBUS with a specific address and constitutes a node point of the BITBUS.

The programmable read-only memory (PROM) linked to each microcontroller $MC_1$, $MC_2$ contains, first, the core system and the local program shared by all of the cards, and second, the tables used for the code conversion of the bit series specific to the card. Therefore, there must not be two identical PROM's.

The physical address of the microcontroller is "connected by strip conductors" onto the card. The safety-equipped remote-monitoring logic LST may, by reading a specific bit series (which may be the bit series R previously used) on the PROM, the correlation between the microcontroller addressed on the BITBUS (physical address) and the bit series received from the corresponding PROM. The random access memory (RAM) linked to each microcontroller $MC_1$ and $MC_2$ constitutes the buffer storage registers for transmission and reception of the series of n bits which are either transmitted at high speed over the multipoint data link or transmitted at lower speed to the other microcontroller of the same sub-central monitoring logic LSC through the switch controller Γ or the relay RA.

The series switch-monitoring or relay RA links are established using a dual Universal Asynchronous Receiver-Transmitter (UART) or Link Controller (FIG. 6), available on each micro-controller DATEM DCB 220 card. Switch monitoring is performed by means of a +12 V current loop at one port, and relay RA monitoring, which is local in the sub-central monitoring logic, is performed by means of RS 422 (+5 V) at another port.

Transmissions to the switch controller Γ and to the relay RA occur at medium speed (maximum of 19200 bit/s), while transmission speed on the BITBUS is 62.5 kbit. Speed adaptation is performed in the buffer storage registers of microcontroller $MC_1$ and $MC_2$ of the sub-central monitoring logic LSC. The other input-output ports available on DATEM cards are used to control the bonding and unbonding relays RC and RD of the relay RA, and for non-safety-equipped inputs-outputs, e.g., switch heaters.

Relay RA is a relay incorporating six reversing switches, of which three ($a_1$, $a_2$, $a_3$) are used for control of the three-phase motor of the switch, two ($a_4$ and $a_5$) for position monitoring of relay RA itself and the last ($a_6$) is used for self-maintenance.

The contacts of relay RA must be capable of bearing the intensity delivered to the motor Mo. On the other hand, they must not be calibrated so as to repeatedly cut off an intensity of this magnitude. In fact, relay RA is prepositioned before the three-phase power supply is connected using the breaker relay RU of the sub-central monitoring logic LSC.

The relay RA must in no case close in an untimely manner; on the other hand, it may, in specific instances, mistakenly unclose when a +12 V failure of the power supply of the sub-central monitoring logic LSC occurs.

The relays RC and RD are two Dual in Line relays which respond to the promptings of the microcontrollers $MC_1$ and $MC_2$ only if the auxiliary power supply is feeding alternating current.

The relays RA, RC, and RD do not have to be of the safety type; however, they must in no instance be liable to close under the effect of vibrations alone.

The power supply fed to a sub-central monitoring logic comprises two parts:

1) a regulated feed composed of a converter block having direct sector breakdown BC which accepts, at its input, both direct and alternating voltage, and which assures the maintenance of the rated outputs during alternating-direct and direct-alternating switching of the auxiliary power supply.

2) a rectified power supply for RC and RD which can furnish power only if the auxiliary power supply fed through $F_4$ and $F_5$ of the power line, is alternating. A transformer TR prevents, in the safety mode, the passage of direct current. A capacitor C is connected in series with TR in order to avoid short-circuiting the direct auxiliary power supply through the primary of the transformer TR. To ensure that the transformer functions under rated conditions, the resonant frequency of the filter constituted by the capacitor C and the primary of the transformer TR must be very low in relation to the 50 Hz operating frequency.

The interfaces of the safety-equipped monitoring logic LST will now be described with reference to FIG. 7. It has already been stated that the safety-equipped remote-monitoring logic was designed to embody inherent safety. The interface between said safety-equipped logic and the sub-central logic must also embody inherent safety. Although very simplified, it must be incorporate safety relays, for example of the NSl type.

A conventional device-control relay CA ensures, by means of the reversing switches $C_1$ and $C_2$, the inversion of the phases Ph2 and Ph3 of the three-phase power supply, so as to invert the direction of rotation of the motor Mo of the apparatus.

A system has been described in which a single motor turns in a direction determined by the safety-equipped remote-monitoring logic LST by means of the exchange of the phases $Ph_2$ and Ph3.

Using only this system, it is possible, given an appropriate diameter of the wires, to control to the right all of the switches which must be moved in this way. During the following operation, all of the switches needing to be moved to the left can be shifted in this way.

The same power command could also be sent from the safety-equipped remote-monitoring logic LST. In this case, the selection of the direction of the power fed to the motors must be transferred to each of the sub-central monitoring logics, at the cost of a slightly more complex relay connection.

A conventional device breaker relay Ru ensures the connection and cut-off of the three-phase power supply over the power line by means of the reversing switches $u_1$, $u_2$, $u_3$, and $u_4$.

A relay Ry ensures the alternating-direct switching of the auxiliary power supply. The interdependence of the relays guarantees that the relay CA can be switched only if the relay Ru is inoperative, that the relay Ru can function only if the relay Ry is in the raised position (corresponding to an auxiliary direct power feed), and that the relay Ry self-maintains its status as long as the relay Ru remains in the raised position, thereby preventing an untimely resumption of the alternating power feed while the three-phase power supply is fed over the line. The auxiliary direct power supply can be obtained using any device, and in particular by the simple rectification and filtering of the alternating feed. Filtering must be performed in the safety mode, since the certainty must exist that the residual alternating ripple factor cannot bring back to the secondary of the transformers of the sub-central monitoring logics a voltage capable of activating a relay RC. The lock-in of the relays RA during direct auxiliary feed would, in this case, no longer be guaranteed.

The additional relay Rx makes it possible when Rx and Ry are both in the lowered position, to cut off all auxiliary power and thus, to cause a drop of the relay RA which has remained closed as a result of a failure of the sub-central monitoring logic.

The sub-central switch-monitoring logic described above represents only one preferred embodiment intended to explain the invention. Others equivalent means or devices, in particular those linked to the electronic cards, could obviously be used while remaining within the field of the invention.

Furthermore, the basic principles underlying monitoring and control, explained with reference to switch monitoring, are applicable in identical fashion to a sub-central monitoring logic for a level crossing. When the specific required adaptations are made, they may also be applied to the safety monitoring and/or control of any device encountered in the field, such as signs at work sites or axle counters, or in switching stations.

We claim:

1. An installation for remotely monitoring and controlling at least one device which contains multiple contacts by individually detecting whether each contact is in an open or closed position, said installation comprising:

safety-equipped remote-monitoring means (LST) for controlling opening and closing operations of said contacts and for monitoring each of said contacts to ensure that said multiple contacts are opened and closed in a safe manner, and a plurality of sub-central monitors ($LSC_i$), each of which is connected to at least one contact of said multiple contacts and to said remote-monitoring means through a data link, said remote-monitoring means including:

means for uniquely addressing a sub-central monitor ($LSC_i$) corresponding to a contact in question and means for generating and transmitting a monitoring signal to said uniquely addressed sub-central monitor;

said uniquely addressed sub-central monitor including:

means for receiving and encoding said monitoring signal to generate return data therefrom, said return data representing an identity and a positional status of said contact in question, and means for transmitting said return data to said remotemonitoring means; wherein said means for transmitting monitoring signals transmits a different monitoring signal during each transmission in order to date the return data transmitted by the uniquely addressed sub-central monitor.

2. The installation for remotely monitoring and controlling devices according to claim 1, wherein safety-equipped remote-monitoring means alone, including and controls all safety electronics and safety, relay-based interfaces, which ensure that said contacts open and close safely in a desired manner.

3. The installation for remotely monitoring and controlling devices according to claim 1, wherein the data link, comprises a power line (A) and a data-link (L).

4. The installation for remotely monitoring and controlling devices according to claim 1, wherein each sub-central monitor includes:

a plurality of encoding devices ($CM_i$, $CV_i$) for encoding said monitoring signals received by said sub-central monitor, each of said encoding devices being physically independent of the other encoding devices and being linked to a corresponding contact to be monitored ($C_i$), wherein each encoding device and a corresponding contact are serially connected such that said a contact only allows said monitoring signal to properly flow there through and be encoded by said encoding device when said contact is in a closed position.

5. The installation for remotely monitoring and controlling devices according to any one of claims 1 through 3, wherein the monitoring signals transmitted and received by the remote-monitoring means and the sub-central monitors comprise: a series of logical bits.

6. The installation for remotely monitoring and controlling devices according to claim 4, wherein each of said encoding devices includes ROM and first and second microcontrollers ($CM_i$ and $CV_i$) connected to said ROM, for code-converting said received monitoring signal to generate said return data, said remote-monitoring means receiving the return data and calculating a certainty level, representing a probability that said monitoring signal has correctly flowed through the contact ($C_i$) and been code-converted by said second microcontroller ($CV_i$).

7. The installation for remotely monitoring and controlling devices according to any one of claims 1 through 2, wherein each sub-central monitor ($LSC_i$) comprises two microcontrollers ($MC_i$, $MC_2$) corresponding to two different addresses on the data link that includes a multipoint line, said two microcontrollers being controlled by the safety-equipped remote-monitoring means (LST) to perform encoding operations on a monitoring signal when said remote-monitoring means uniquely addresses said sub-central monitor corresponding to said two microcontrollers, said two microcontrollers being connected, respectively, to corresponding contacts ($\Gamma_1$, $\Gamma_2$) of said device.

8. The installation for remotely monitoring and controlling devices according to any one of claims 1 through 2, wherein a device position is monitored based on a series of n "dated" bits transmitted by said transmitting means in the safety-equipped remote-monitoring means (LST) to the corresponding sub-central monitor linked to the device to be monitored ($LSC_i$), said transmitting means in said sub-central monitor sending back, in return and after code conversion, return data containing a return series of n bits, said safety-equipped remote-monitoring means (LST) including means for calculating an expected bit series based on the monitoring signal and means for evaluating a distance between said expected bit series and the return bit series, said expected bit series representing the bit series transmitted from the remote-monitoring logic and code-converted by the sub-central monitor ($LSC_i$) linked to the contact being monitored, and wherein a "closed" contact status is identified by the safety-equipped remote-monitoring logic (LST) in the monitored contact, if the distance measured is less than or equal to a predetermined threshold stored in said remote-monitoring logic.

9. The installation for remotely monitoring and controlling devices according to claim 7, wherein the safety-equipped remote-monitoring means (LST) transmits two n-bit series ($E_1$, $E_2$) in said monitoring signal, each of which is received by a different microcontroller ($MC_1$, $MC_2$), each microcontroller transferring a received bit series to the other microcontroller ($MC_2$, $MC_1$) through contacts ($\Gamma_1$, $\Gamma_2$) of the device controller, the safety-equipped logic (LST) receiving, in return, a transformed bit series ($S_1$ or $S_2$) which uniquely identifies the position of the contacts to be monitored and of the microcontroller through which the series has passed.

10. The installation for remotely monitoring and controlling devices according to any one of claims 1 through 3, wherein a power line ($F_1$ to $F_5$) in the data link is subdivided into a three-phase power-feed line ($F_1$ to $F_3$), that is operated by the remote-monitoring means to manipulate the device to be remotely monitored, and an auxiliary power-feed line ($F_4$, $F_5$) for feeding the sub-central monitors ($LSC_i$).

11. The installation for remotely monitoring and controlling devices according to claim 1, wherein remote control of the device is effected by a motor (Mo) controlled by a relay (RA) of the device in question, which controls a three-phase power supply of said motor, a direction of movement being determined by the phases, at least one of said safety-equipped remote-monitoring logic (LST) and said sub-central monitors ($LSC_i$) including means to invert said phase in order to reverse said direction of movement.

12. The installation for remotely monitoring and controlling devices according to claim 11, wherein the relay (RA) of the device is controlled by a bonding relay (RC) controlled, in return, by a first of two microcontrollers ($MC_2$) included in each sub-central monitor ($LSC_i$) and by an unbonding relay (RD), which is controlled by a second of said two microcontrollers (MCl) in each sub-central monitor ($LSC_i$).

13. The installation for remotely monitoring and controlling devices according to claim 12, wherein the bonding (RC) and unbonding (RD) relays of the device relay (RA) are fed by an auxiliary power supply ($F_4$, $F_5$).

14. The installation for remotely monitoring and controlling devices according to claim 1, wherein an interface between the safety-equipped remote-monitoring logic (LST) and a power line ($F_1$ to $F_5$) includes safety components, which ensure that said each contact opens and closes safely in a desired manner.

15. The installation for remotely monitoring and controlling devices according to claim 14, wherein the interface between the safety-equipped remote-monitoring logic (LST) and the power line ($F_1$ to $F_5$) is produced using safety relays ($R_u$, $R_x$, $R_y$, CA).

16. The installation for remotely monitoring and controlling devices according to claim 1, wherein the data link utilizes radio electric transmission.

17. The installation for remotely monitoring and controlling devices according to claim 1, wherein said installation is used for monitoring and controlling a plurality of switches.

18. The installation for remotely monitoring and controlling devices according to claim 1, wherein said installation is used for monitoring and controlling level crossings.

19. The installation for remotely monitoring and controlling devices according to claim 1, wherein said installation is used for monitoring contacts, such as route monitoring, and to control the connection of contacts such as by route commands.

20. The installation of claim 1, wherein said data link connecting said remote-monitoring and sub-central monitoring logic is a plurality of point-to-point data links.

21. The installation of claim 1, wherein said data link connecting said remote-monitoring and sub-central monitoring logic is a multi-point data link.

* * * * *